United States Patent [19]
Baucom

[11] 3,981,966
[45] Sept. 21, 1976

[54] ZINC RECOVERY FROM ACIDIC AQUEOUS STREAMS

[75] Inventor: Everett Ira Baucom, Kennett Square, Pa.

[73] Assignee: E. I. Du Pont de Nemours and Company, Wilmington, Del.

[22] Filed: July 26, 1974

[21] Appl. No.: 492,230

[52] U.S. Cl.................................. 423/104; 423/24; 423/622
[51] Int. Cl.².......................................... C01G 9/02
[58] Field of Search ............... 423/24, 100, 104, 35, 423/42, 43, 101, 102, 622

[56] References Cited
UNITED STATES PATENTS

| | | | |
|---|---|---|---|
| 1,154,602 | 9/1915 | Best .................................... | 423/104 |
| 1,331,334 | 2/1920 | Field .................................... | 423/104 |
| 2,128,311 | 8/1938 | Mertes .................................. | 423/104 |
| 2,639,975 | 5/1953 | Muller et al. ........................ | 423/104 |
| 3,224,873 | 12/1965 | Swanson ........................... | 423/24 X |
| 3,453,072 | 7/1969 | Vian-Ortuno et al............... | 423/104 |
| 3,794,719 | 2/1974 | Lowenhaupt et al. ........... | 423/100 X |

FOREIGN PATENTS OR APPLICATIONS

| | | | |
|---|---|---|---|
| 572,977 | 3/1959 | Canada............................... | 423/622 |

OTHER PUBLICATIONS
C.I.M. Bulletin, Feb., 1975, pp. 105, 106, 113, (Ritcey et al.).
Fletcher et al., "Napthenic Acid as a Liquid–Liquid Extraction Reagent for Metals" Inst. Mining & Metallurgy, England 1961, pp. 355, 365.

Primary Examiner—Oscar R. Vertiz
Assistant Examiner—Brian E. Hearn

[57] ABSTRACT

A process for the recovery of metal values, principally zinc and copper, from an aqueous acidic purge stream in a hydrometallurgical process by contacting the stream containing the iron, copper and zinc sulfates, along with trace amounts of other metallic sulfates with calcium oxide to bring the pH in the range 3.0–4.0, thence with sufficient ammonia to form the soluble tetrammine sulfates of copper and zinc, then separating the copper from the zinc, e.g. by hydroxy oxime-solvent extraction and thereafter recovering the zinc as zinc oxide by converting the zinc tetrammine sulfate to the hydroxide and removing ammonia from the complex.

9 Claims, 1 Drawing Figure

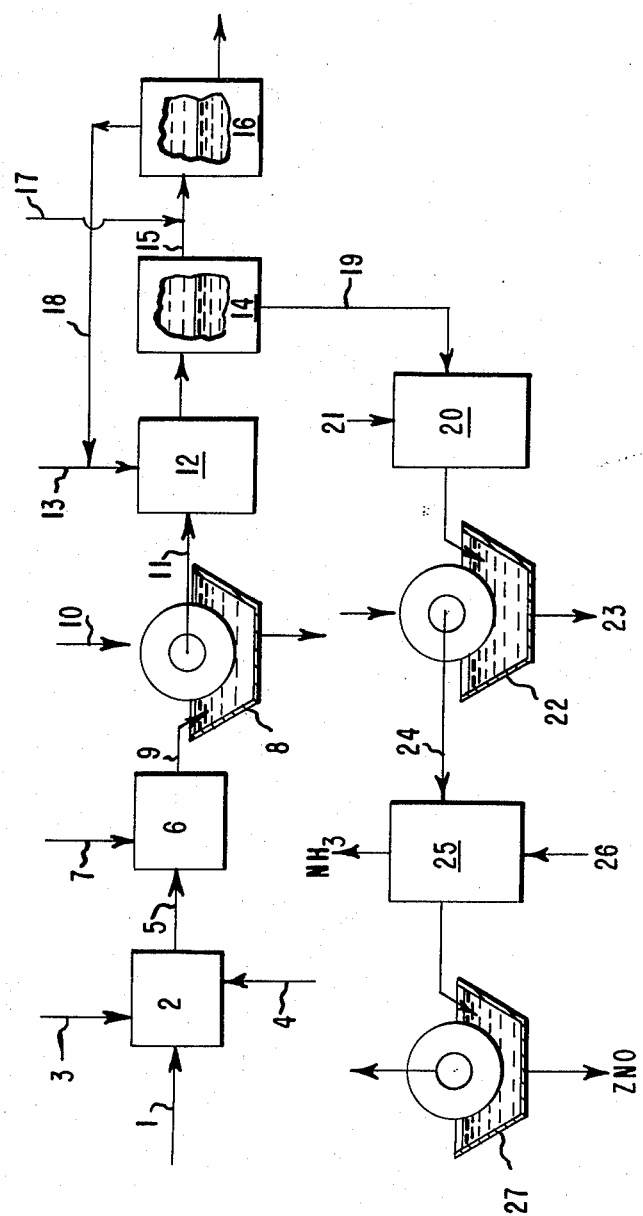

ZINC RECOVERY FROM ACIDIC AQUEOUS STREAMS

BACKGROUND OF THE INVENTION

The present invention relates to a process for the recovery of metal values present at low concentration in acidic aqueous solutions and more particularly to a process for the separation of copper and zinc from other metallic ions and the recovery of zinc and copper.

DESCRIPTION OF THE PRIOR ART

The use of ammonia to recover zinc as the hydroxide or oxide has been suggested. U.S. Pat. No. 2,639,975 issued on May 26, 1953 to F. A. Miller et al. discloses a process for the recovery of zinc from carbonated zinc ores by adding ammonia to form a complex of the general formula $[Zn(NH_3)_4]^{++}$ and after removal of impurities, decomposing the complex by heating to expel ammonia and thereby precipitate zinc hydroxide while a variation of the general process is shown in U.S. Pat. No. 3,719,451 issued on Mar. 6, 1973 to Z. L. Burke. U.S. Pat. No. 3,453,072 issued on July 1, 1969 teaches that the removal of ammonia from the zinc complex is improved by the addition of calcium oxide slurry. Control of the physical properties of the zinc oxide obtained by the decomposition of the zinc ammoniacal complex is discussed in Canadian Patent No. 572,977 issued to W. Furness on Mar. 24, 1959.

SUMMARY OF THE INVENTION

Zinc, in the form of zinc oxide and hydrated zinc oxide, is recovered from aqueous acidic streams obtained in hydrometallurgical processing which streams comprise iron, copper and trace amounts of other metal ions as sulfates by contacting the stream with sufficient calcium oxide to control the pH in the range 3.0–4.0 while maintaining iron in the ferric state, adding sufficient ammonia to form the soluble amine complexes of zinc and copper in the aqueous stream, separating the copper from the zinc by extraction with an organic solvent containing a complexing agent for copper and thereafter recovering zinc from the resultant aqueous solution by replacing the sulfate ion in the zinc salt with hydroxyl ion and finally recovering zinc oxide from the hydroxyl complex.

More particularly, the present process separates the zinc ion from metal ions including copper and iron contained in an acidic aqueous sulfate solution and recovers zinc as zinc oxide by the sequential steps of (a) adding sufficient calcium oxide to said solution to adjust the pH thereof to the range 3.0–4.0 and maintaining said solution at a temperature of at least 60°C. while passing an oxygen-containing gas therethrough for a period sufficient to precipitate iron in the ferric state; (b) adding sufficient ammonia usually as ammonium hydroxide to the product of step (a) to form the tetrammine sulfate complexes of substantially all of the zinc and copper ions present; (c) separating the liquid and solids from step (b); (d) contacting one part by volume of the liquid from step (c) with less than one part of a substantially water-insoluble liquid hydrocarbon containing at least about 0.10 mole per liter of a hydrocarbon soluble copper chelating compound, e.g. a hydroxy oxime, whereby the cupric ion is extracted from the aqueous phase and thereafter separating the aqueous and hydrocarbon phases; (e) contacting the aqueous phase from step (d) with sufficient ammoniacal calcium oxide to neutralize substantially all acid present and to convert the zinc tetrammine sulfate to zinc tetrammine hydroxide and remove substantially all of the sulfate ion by precipitation as calcium sulfate; (f) separating the liquid from solids from step (e); (g) contacting the liquid from step (f) with a gas comprising water vapor whereby ammonia is liberated by the decomposition of the zinc tetrammine complex to hydrated zinc oxide which precipitates; and (h) recovering zinc oxide from the product of step (g).

DETAILED DESCRIPTION OF THE INVENTION

The recovery or separation process of the present invention is particularly useful in the separation of zinc and copper ions from other ions, e.g. iron, aluminum and magnesium with trace amounts of cobalt, manganese, molybdenum, bismuth, antimony, nickel and arsenic being present. Typically these metal ions are obtained in acidic aqueous solution from conventional hydrometallurgical processes which leach metal values from ores or ore concentrates using acids at elevated temperature. More particularly, the present process separates zinc and copper from iron and recovers zinc as zinc oxide from a leach solution obtained by countercurrently contacting an ore concentrate, e.g. chalcopyrite, with an aqueous solution of nitric and sulfuric acids at a temperature in the range 100°–110°C. In a typical process the leach solution initially contains, based upon the iron and copper in the chalcopyrite, about 1.4–1.7 parts of sulfuric acid per part of copper, about 2.0–3.0 parts of sulfuric acid per part of iron, and about 2.0–4.0 parts of nitric acid per part of copper and water to produce a final solution containing about 4–9 parts of copper per 100 parts of solution. After the leaching, the nitrate in the solution is then reduced to less than about 10 grams per liter in the presence of fresh concentrate and ferrous ion is generated.

After separating the liquid and solids from the leaching step, the liquid which contains at least 2.7 parts of ferrous ion per part of nitrate ion is then heated to a temperature in the range 160°–180°C. wherein the ferrous and nitrate ions react with the result that the nitrate concentration is reduced to less than about one gram per liter. The resultant solution is contacted with ammonia and a molecular oxygen containing gas at a temperature in the range 160°–180°C. to precipitate iron as ammonojarosite. After the precipitate is removed the solution now containing less than about 5 grams/liter of iron is directed to electrolytic cells where 40–75% of the copper is recovered. For example, the solution (electrolyte) can be introduced into cells having a high internal rate of circulation of electrolyte such as those disclosed in U.S. Pat. No. 3,483,568 issued on Dec. 16, 1969 and U.S. Pat. No. 3,558,466 issued Jan. 26, 1971. A current density of 10–20 amps/ft$^2$ is employed and the copper in solution is reduced to about 1–4 parts per 100 parts of solution while maintaining a temperature of 25°–60°C. A portion of this spent electrolyte, e.g. 7–10% of the total stream, is removed as purge and treated according to the process of this invention.

A more complete understanding of the present invention may be had by referring to the drawing of FIG. I attached hereto and made a part of the present specification which shows a continuous process for recovering zinc oxide values from a purge stream of leach liquor such as that described hereinabove. The leach liquor is introduced via line 1 into reactor 2 where it is thoroughly contacted with an aqueous slurry of calcium oxide introduced via line 3 in sufficient amount to adjust the pH of the contents of reactor 2 in the range 3.0–4.0. Iron is maintained or oxidized to the ferric state by passing an oxygen-containing gas, e.g. air, from line 4 through the reactor 2.

Approximately 1 hour holdup is provided in reactor 2 for digestion of the reactants, to assure that substantially all of the iron is precipitated in the ferric state, and that other metals such as aluminum, antimony, bismuth, arsenic and molybdenum, a substantial portion of which are precipitated in this step, are in a readily filterable form before transfer of the contents of the reactor via line 5 to reactor 6. Aqueous ammonium hydroxide is introduced through line 7 to reactor 6 in amounts sufficient to form the soluble tetammine complexes of zinc and copper and results in an increase in the pH of the stream of 10.5–11.5. Nickel, magnesium and any manganese which is not precipitated in the previous reactor is precipitated in this stage. Holdup may also be provided in reactor 6 to insure a readily filterable precipitate. The slurry from reactor 6 is then passed to filter 8 via line 9. Calcium sulfate and insuluble metallic hydroxides are removed as filter cake. The cake is washed with aqueous ammonium hydroxide. The filtrate which contains the soluble zinc and copper complexes is directed via line 11 to reactor 12 where it is thoroughly contacted, preferably in a multistage countercurrent manner with a hydrocarbon soluble copper chelating agent in a hydrocarbon solvent introduced through line 13. After contact the liquids are separated in separator 14 and the organic phase containing the copper amine complex is directed via line 15 to separator 16 after injecting sulfuric acid into the organic via line 17 to remove the copper therefrom. The organic from separator 16 is recycled via line 18 to extractor 12. The aqueous stream from separator 14 is directed via line 19 to reactor 20 where it is contacted with an ammoniacal slurry of calcium oxide introduced through line 21 in slight excess of the amount required to neutralize all remaining sulfuric acid and to form zinc tetrammine hydroxide. The resultant slurry is directed to filter 22 where the precipitated calcium sulfate and excess calcium oxide are removed as filter cake 23. Aqueous ammonium hydroxide is used as a cake wash. The filtrate is then directed via line 24 to reactor 25 where steam is introduced through line 26 to remove ammonia from the zinc complex with the result that the zinc is precipitated as zinc oxide and hydrated zinc oxide and is recovered as filter cake from filter 27. The aqueous solution from separator 16 can be treated in a known manner to recover the copper therein.

The process of the present invention may be applied to aqueous streams having various metal ions in varying concentrations including varying levels of zinc and copper ion. Since both zinc and copper are formed as the water-soluble tetrammine complexes it is preferred to retain the complexes in solution, i.e. at concentration of about 5–15 g/l during the precipitation of the other metal ions. The efficiency of the present process is reduced if a portion of these complexes precipitate at this point because it is necessary to separate the precipitated complexes from other metal precipitates, e.g. iron, if it is desired to recover the zinc and copper. It is preferred to reduce the copper concentration in the stream when the initial concentration is on the order of 10–30 grams per liter before the stream is treated according to the process of the present invention. Metals which are precipitated by the addition of calcium oxide, e.g. iron and aluminum, may also vary considerably without adversely affecting the process but require adjusting the amount of calcium oxide according to the concentration of these metals. Higher levels of sulfate also require greater amounts of calcium oxide. It should also be noted that the rate of reaction increases with increasing amounts of calcium oxide in any event, satisfactory results are obtained if the pH of the stream is controlled within the above discussed limits.

Temperatures above 30°C. and especially 50°–65°C. are preferably maintained in each step of the present process where precipitation occurs.

The filterability of the precipitates can be improved by digestion and at least in the initial precipitation by the maintenance of conditions which assure the precipitation of iron in the ferric state. Accordingly, if significant amounts of iron in the stream being processed are in the ferrous state, then oxidizing conditions must be maintained in the initial precipitation to assure that substantially all of the iron precipitates as ferric hydroxide. The preferred method for maintaining oxidizing conditions is the introduction of air into the reactors.

The time required for digestion to produce slurries having satisfactory characteristics increases with decreasing temperatures. The optimum digestion or holdup time in each reactor is readily determined. Generally the initial precipitate should be digested for the longest time and subsequent precipitates, e.g. calcium sulfate dihydrate, require minimal digestion. Generally at least two hours of digestion are usually required in the initial precipitation at temperatures of about 30°C. while about 45 minutes to 1 hour is satisfactory at 60°C.

The organic extractant, i.e. the copper complexing agent employed to separate copper from zinc is not critical to the present process. Suitable extractants include oximes and quinolines, e.g. 7-alkyl-8-hydroxyquinolines (nonyl-8-hydroxyquinoline); 2-hydroxybenzophenone oxime and 5-alkyl-2-hydroxybenzophenone oximes (e.g. 5-nonyl-2-hydroxybenzophenone oxime). Other compounds will be apparent to those skilled in the art.

The substantially water-insoluble solvent for the extractant can be any of the aliphatic hydrocarbon petroleum distillates such as kerosene, naphtha, and the like, including mixtures of the foregoing organics. Hydrocarbons having 6–18 carbon atoms are preferred. Available aliphatic hydrocarbons include those sold under the term "Napoleum 470" which is a distillate of sweet midcontinent crudes and has a specific gravity of 0.81, a distillation range of 210°–240°C., an average molecular weight of about 175 and a flash point of 83°C. The selection of the organic solvent is not critical provided that the extractant is sufficiently soluble therein and the resultant organic solution is readily separable from the aqueous streams being treated. The ratio of the aqueous phase to the organic phase should be controlled to prevent excessive transfer of zinc to the organic phase along with copper. In a three stage extraction with a total contact time of two minutes employing 10% by volume of the trans isomer of 2-hydroxy-5-nonyl-diphenyloxime sold under the tradename "LIX" 64N in Napoleum 470 an aqueous to organic ratio of 3:1 performed satisfactorily whereas excessive transfer of zinc to the organic phase occurred using an aqueous to organic ratio of 1:2 at otherwise similar conditions. At high concentrations of zinc ion, e.g. 35–75 g/l the zinc may be precipitated as the oxime or quinoline complex during the extraction of copper and in such instance it would be necessary to separate the precipitate from the liquid phase and reconvert it to the soluble complex before further processing to recover the zinc according to the present process.

Removal of ammonia from the zinc tetrammine hydroxide complex can be accomplished by various methods but in the instant process it is preferred to remove ammonia by steam stripping. When steam is introduced directly into the solution of the zinc tetrammine hydroxide the precipitate tends to remain suspended in the solution rather than adhering to the walls of the reactor as is the case when decomposition is effected in a hot wall evaporator. In addition to the aforementioned advantage the steam-stripped ammonia is readily recovered in reusable form.

The precipitate is recovered from the slurry after steam stripping and dried following which it is converted to zinc oxide by heating. If desired, trace metals such as cobalt may be removed from the solution before precipitation of the hydrated zinc oxide by cementation on zinc metal.

EXAMPLE

The following example is presented to illustrate, but not to restrict the present invention.

A solution having 143 g/l of sulfuric acid and elements to provide the following composition was prepared:

| Element | Concentration, g/l | Source |
|---------|--------------------|--------|
| Cu | 10 | $CuSO_4 \cdot 5H_2O$ |
| Fe | 3 | $Fe_2(SO_4)_3 \cdot 9H_2O$ |
| Al | 3 | $Al_2(SO_4)_3$ |
| Mg | 1.5 | $MgSO_4 \cdot 7H_2O$ |
| Zn | 15 | $ZnSO_4 \cdot 7H_2O$ |
| Co | .06 | $CoSO_4 \cdot 7H_2O$ |
| Mn | .20 | $MnSO_4 \cdot H_2O$ |
| Mo | .03 | $(NH_4)_6Mo_7O_{24} \cdot 4H_2O$ |
| Bi | .008 | $BiCl_3$ |
| Sb | .02 | $Sb_2O_3$ |
| Ni | .10 | $NiSO_4 \cdot 6H_2O$ |
| As | .002 | $As_2O_3$ |

This composition represents a typical purge stream obtained by the leaching of a predominantly chalcopyrite-containing concentrate using a combination of nitric and sulfuric acids as described hereinabove,.

Approximately 100 ml. of water and 7.5 grams of $CaSO_4 \cdot 2H_2O$ were charged to a 2-liter stirred round bottom, four-neck flask fitted to accept the purge solution, a subsurface air sparge, the slurry and a stirrer. The $CaSO_4 \cdot 2H_2O$ was used as "seed" and would not have to be added in a continuous process. An air sparge was commenced through the flask and the contents heated to 60°C. following which an aqueous slurry containing 13 grams of CaO per 100 ml. was pumped slowly into the flask simultaneously with 300 ml. of the purge solution described above. The rate of addition of the slurry and purge solution was adjusted to maintain the pH of the contents of the flask at 3.5–4.0. After the addition of the reactants the slurry was digested by heating for 1¾ hours at 60°C. with stirring. The resultant slurry was then removed from the flask and replaced with 200 ml. of concentrated ammonium hydroxide (15M) which was then heated to 60°C. The initially prepared slurry and an additional 575 ml. of concentrated ammonium hydroxide were slowly pumped into the flask while maintaining the temperature of the contents at approximately 60°C. with stirring. After addition of the slurry and the concentrated ammonium hydroxide was completed the contents of the flask were digested for 1 hour following which the solids and liquid were separated by filtration. The filter cake was washed with 500 ml. of 7M $NH_4OH$. The filtrate was then contacted in three stages with the trans isomer of 2hydroxy-5-nonyl-diphenyloxime (LIX 64N) present at a concentration of approximately 10% in an aliphatic hydrocarbon (Napoleum 470) at an aqueous to organic ratio of approximately 3:1 following which the aqueous and organic phases were separated. Copper was stripped from the organic phase in a single stage by contact with an aqueous solution containing 170 grams per liter of sulfuric acid with an aqueous to organic ratio of 2:1. The aqueous phase from the extraction was stirred over activated charcoal to remove any entrained organic and thereafter transferred to a round bottom four-neck flask following which 7.5 grams of $CaSO_4 \cdot 2H_2O$ (as "seed") was added to the flask and the resultant slurry was heated to 60°C. with stirring. A slurry containing 4.6 grams of CaO (approximately 20% in excess of that required to react with the remaining sulfate) in 100 ml. of 7M $NH_4OH$ was then introduced into the flask over a period of approximately ten minutes following which the slurry was digested with stirring for 1 hour at approximately 60°C. The solids were separated from the liquid by filtration, the filter cake was washed with 100 ml. of 7M $NH_4OH$ and the filtrate and wash were placed in an open beaker on a hot plate and steam injected into the solution. The temperature of the hot plate and the rate of steam addition were adjusted to maintain the volume of the solution approximately constant. Ammonia evolved. Steam introduction was continued until the pH of the slurry decreased to 7.0–7.5. The product (partially hydrated zinc oxide) was recovered from the slurry by filtration and washed with water and then acetone and finally dried under vacuum at 140°C. The product was analyzed for the elements set forth in Table I below and was found to have a bulk density of 0.47 gram per cc. Additional experiments yielded products having bulk densities in the range 0.25–1.48 per cc. and surface areas in the range 3–10 square meters per gram. An average analysis for products obtained according to the present invention is shown in the second column of Table I.

TABLE I

| | Percentage | |
|---|---|---|
| Component | Example | Average |
| Cu | 0.0038 | 0.01 |
| Fe | 0.0063 | 0.003 |
| Al | 0.86 | 1.1 |
| Mg | 0.003 | 0.004 |
| Ca | <0.0005 | 0.0005 |
| Cd | <0.0005 | 0.0005 |
| Mn | <0.0005 | 0.0005 |
| $SO_4^-$ | 3.75 | 6.2 |
| Pb | — | <0.0005 |

It was determined that the zinc oxide products prepared according to the present invention are exceptionally active in rubber compounding.

I claim:

1. A process for recovery of zinc from aqueous acidic streams obtained in hydrometallurgical processing which streams comprise iron, copper and trace amounts of the metal ions in addition to zinc ion, which process comprises, in sequence, contacting said stream with sufficient calcium oxide to control the pH in the range 3.0–4.0 while maintaining iron in the ferric state, adding sufficient ammonia to form the soluble amine complexes of zinc and copper in the aqueous stream, separating the copper from the zinc by extraction with an organic solvent containing a hydroxy oxime and thereafter recovering zinc from the resultant aqueous solution by replacing the sulfate ion in the zinc salt with hydroxyl ion and thereafter recovering zinc oxide from the hydroxyl complex by removing ammonia from the complex.

2. The process of claim 1 wherein the slurry resulting from contacting the stream with calcium oxide to control the pH in the range 3.0–4.0 is digested.

3. The process of claim 2 wherein the sulfate ion of the zinc salt in the aqueous solution is replaced with the hydroxyl ion by the addition of a slurry comprising ammoniacal calcium oxide and hydroxide to the solution.

4. The process of claim 3 wherein the solids are separated from the liquid after the initial addition of ammonia.

5. A process for separating metal values comprising the sulfates of iron, copper and zinc contained in an acidic aqueous solution which comprises the sequential steps of
  a. adding calcium oxide to said solution to adjust the pH in the range 3.0–4.0 while maintaning iron in the ferric state,
  b. adding sufficient ammonia to the stream from step (a) to form soluble tetrammine sulfates of copper and zinc and to maintain said sulfates in solution while precipitating insoluble metal hydroxides,
  c. separating the liquids and solids from step (b),
  d. extracting the copper ion from the liquid from step (c) by contacting the liquid with a hydroxy oxime contained in an organic solvent, thereby forming an organic phase containing the cupric ion and an aqueous phase containing the zinc ion,
  e. separating the aqueous and organic phases from step (d),
  f. converting the zinc tetrammine sulfate in the aqueous phase from step (e) to zinc tetrammine hydroxide and precipitating substantially all remaining sulfate as calcium sulfate dihydrate by contacting the aqueous phase with a slurry comprising ammoniacal calcium oxide and hydroxide,
  g. recovering zinc from the zinc tetrammine hydroxide by removing ammonia therefrom and precipitating the zinc as hydrated zinc oxide.

6. The process of claim 5 wherein the product of step (a) is digested at a temperature of at least 40°C. for a period of at least 30 minutes.

7. The process of claim 6 wherein the iron is maintained in the ferric state in step (a) by contacting the solution with an oxygen containing gas.

8. The process of claim 7 wherein the ammonia is removed from the zinc tetrammine complex by steam stripping.

9. A process for the separation of zinc ion from metal ions including copper and iron contained in an acidic aqueous sulfate solution and recovery of zinc as hydrated zinc oxide which comprises the sequential steps of
  a. adding sufficient calcium oxide to said solution to adjust the pH thereof to about 3.5 and maintaining said solution at a temperature of at least 60°C. for a period of at least 30 minutes while passing an oxygen containing gas therethrough,
  b. adding of sufficient ammonium hydroxide to the product of step (a) to form and maintain in solution the tetrammine sulfate complexes of substantially all of the zinc and copper ions present,
  c. separating the liquid and solids from step (b),
  d. contacting one part by volume of the liquid from step (c) with less than one part of a substantially water-insoluble liquid hydrocarbon containing at least 0.10 moles per liter of a hydroxy oxime whereby the cupric ion is extracted from the aqueous liquid and separating the resultant aqueous and organic phases,
  e. contacting the aqueous phase from step (d) with amounts of a slurry comprising sufficient ammoniacal calcium oxide and hydroxide to neutralize substantially all acid present and to convert the zinc tetrammine sulfate to zinc tetrammine hydroxide and to remove the sulfate ion by precipitation of calcium sulfate dihydrate,
  f. separating the liquid and solids from step (e),
  g. contacting the liquid from step (f) with a gas comprising water vapor whereby ammonia is liberated by the decomposition of the zinc tetrammine complex to hydrated zinc oxide which precipitates,
  h. recovering zinc oxide from the product of step (g) by drying and thereafter heating the precipitate.

* * * * *